July 26, 1966   T. W. BRIEGEL, JR   3,262,720
CONNECTOR
Filed May 15, 1963

INVENTOR.
Theodore W. Briegel, Jr.
BY
ATTORNEYS

United States Patent Office 3,262,720
Patented July 26, 1966

3,262,720
CONNECTOR
Theodore W. Briegel, Jr., Galva, Ill., assignor to Roach-Appleton Manufacturing Company, South Bend, Ind., a corporation of Delaware
Filed May 15, 1963, Ser. No. 280,680
2 Claims. (Cl. 285—161)

The present invention relates to improvements in electrical connectors and couplings for rigidly joining electrical conduits to electrical outlet boxes or for joining the ends of conduits to each other, and particularly to improved weather-proof conduits and connectors.

The present invention provides a simple and rugged connector and coupling which obtains a seal between the conduit and connector which prevents the free passage of water or moisture, dust, or the free flow of air or gases and is to be used in various environments where a seal connector is required. While the features of the invention are useful for both couplings and connectors for convenience of explanation the unit will be referred to as a connector except where a specific form of coupling is described, and the description and claims are to be so interpreted.

In an embodiment of the invention the connector incorporates a tubular insert which is usually threaded and has an outwardly flared inner end, a smoothly tapered sleeve having at its inner end an annular flange overlying the flared end and in locking engagement therewith, a resilient ring within the sleeve having a tapered outer surface conforming to the inner surface of the sleeve and having an inner end abutting said insert, with the inner diameter of the ring being substantially the same as the inner diameter of the outer end of the sleeve which are of the diameter of a conduit for snugly receiving a conduit and preventing leakage along the conduit either outside or inside of the ring. The ring may be provided with small annular inwardly extending ridges or hooker rings and may be provided with an annular radially inwardly projecting flange of resilient material at the inner end for abuttingly and sealingly receiving the end of the conduit.

It is accordingly an object of the present invention to provide an improved electrical connector of simple and rugged construction which will sealingly receive and connect to the end of the conduit.

A further object of the invention is to provide an electrical connector having a resilient sealing ring therein of improved structure which coacts with the connector to facilitate simple insertion of the end of a conduit and to seal around the outer surface of the conduit.

A further object of the invention is to provide an improved connector with a sealing ring inside wherein the depth of insertion of an electrical conduit is limited and the position of the conduit will be positively fixed within the connector for optimum sealing coaction with the conduit.

A further object of the invention is to provide an improved connector which is rapidly and simply made and assembled in manufacture.

A still further object of the invention is to provide an improved connector embodying a resilient sealing ring having resilient hooker rings serving the dual function of forming an improved seal with a conduit end, and facilitating handling in the process of making the rings.

Other objects, advantages and features of the invention will become more apparent with the teaching of the principles thereof in connection with the disclosure of the preferred embodiments in the specification, claims and drawings, in which:

On the drawings.

Figure 1:
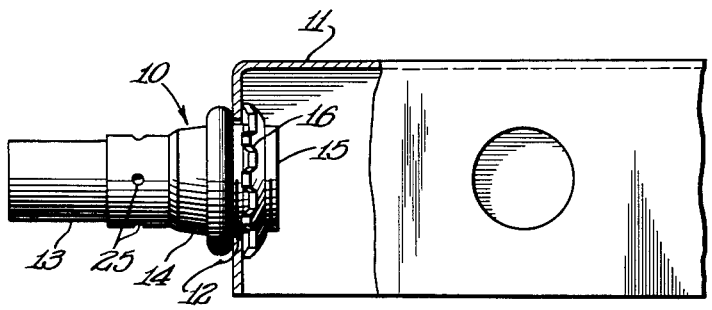
FIGURE 1 is a side elevational view of an electrical assembly including a connector embodying the principles of the present invention with parts broken away from a junction box to better illustrate the relationship between the parts.

In FIGURE 1 the electrical connector 10 is shown connected to a junction box 11 inserted into a side opening 12 thereof. The end of the conduit 13 is received and held by the connector 10.

Figure 2:
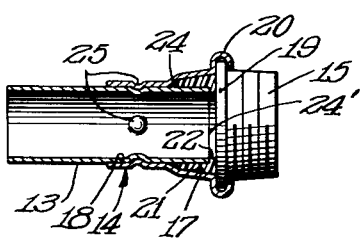
FIGURE 2 is a side elevational view of a connector with parts shown in section.
Figure 3:
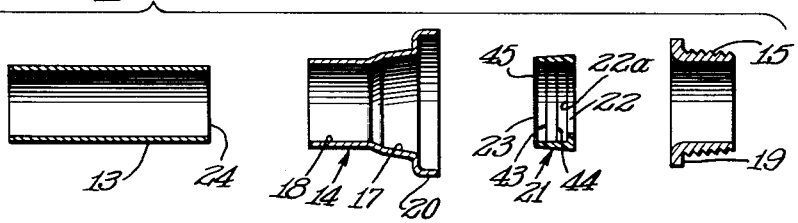
FIGURE 3 is an exploded view showing the parts of a connector with a conduit before assembly.

The connector includes, as shown in FIGURES 1–3, a sleeve 14 joined to a tubular insert 15. The insert is threaded for receiving a threaded female locking ring 16 which screws onto the connector after it has been inserted into the opening 12 in the box, in the conventional manner.

The insert 15 has an outwardly flared inner end 19. The sleeve 14 is smoothly tapered having at its larger inner end an annular flange 20 which overlies the flared end 19 of the insert, and is turned firmly over the end 19 to be in locking engagement therewith. The parts are shown in FIGURE 3 before assembly, and as will be observed, before the insert 15 is joined to the sleeve 14 a resilient ring 21 is placed within the sleeve.

The sleeve is generally smoothly tapered on its inner surface, and in the preferred form is shown with a tapered inner surface 17 at one end and a cylindrical surface 18 at the other end. The cylindrical surface 18 is of a size to receive the end of the conduit 13.

As will be appreciated, the connector 10 is normally assembled by the manufacturer, and is used by the electrician on the site by inserting the end of the conduit 13 into the connector and locking it within the connector by an indentation tool which forces in small dimples or indentations in the metal of the sleeve to also force inwardly small indentations in the conduit and thereby lock the conduit to the sleeve. These indentations are shown at 25 in FIGURES 1 and 2.

The resilient ring is formed of a resilient essentially non-compressible material such as rubber or plastic having the desired properties to resist deterioration and the temperatures encountered in the installation contemplated.

The ring 21 has an outer tapered surface which conforms substantially to the taper of the surface 17 of the sleeve 14. The inner diameter of the ring is substantially the same as the outer diameter of the conduit 13. The outer end 24 of the ring 21 is in a substantial radial plane with a small space between the end 24 and the inner surface 17 of the sleeve as shown in FIGURE 2. Thus, when the end 24' of a conduit 13 is forced into the ring 21, it will tend to expand radially outwardly a slight amount with the excess material squeezed axially into the space between the end 24 of the ring and the sleeve, placing the ring 21 under a slight compressive stress to cause it to seal tightly against the outer surface of the conduit and against the inner surface 17 of the sleeve.

The ring 21 is provided with a radially inwardly extending flange 22 at its inner end which provides a shoulder 22a against which the end 24' of the conduit seats and seals. Thus, the conduit can be forced rather hard into the connector 10 and will seat firmly against the shoulder 22a without passing too far into the connector 10. The inner diameter of the flange 22 is substantially the same as the inner diameter of the conduit 13 providing a protector for the end of the conduit and a smooth passage for wires which are inserted therethrough. This also protects the end of the conduit so that the covering of the wires does not rub against an exposed metal edge.

For enhancing the seal between the ring 21 and the conduit, an inwardly raised rib or ring such as 43 and 44 may be provided on the inner surface of the ring 21, and these may be termed "hooker rings." These ribs 43 and 44 will tend to substantially flatten when the conduit is inserted into the ring 21, and will insure that the ring 21 seats more firmly against the tapered surface 17 of the sleeve 14.

The ribs 43 and 44 serve an additional function in that resilient rings are conveniently manufactured by a molding operation and when the mold is split it has a recess in one part and a projection in the other part. The projection has recesses to form the ribs 43 and 44 and the ring will thus stay on the projection of the mold rather than remaining in the recess, and the rings are easier to remove from the projections than from the recesses of the mold.

Figure 5:
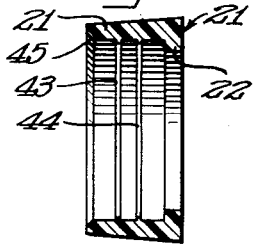
FIGURE 5 is an enlarged detailed view of the sealing ring of the assembly.

The outer end 23 of the ring 21 may be chamfered to form an inner guide surface 45 as shown in FIGURES 3 and 5. This facilitates easier insertion of the conduit and prevents turning the end of the ring inwardly when the conduit is inserted.

Figure 4:
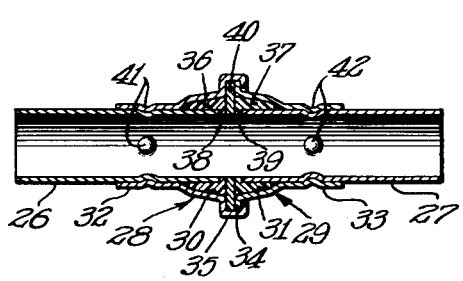
FIGURE 4 is a vertical sectional view of a coupling embodying the principles of the present invention.

In the structure illustrated in FIGURE 4 the principles of the invention are embodied in a connector. The connector has first and second sleeves 32 and 33 which receive the ends of conduits 26 and 27. Within the sleeves are resilient rings 36 and 37 each having an annular inwardly extending flange 38 and 39 at its inner end. The sleeves have smoothly tapered inner surfaces 30 and 31 at their inner ends and cylindrically shaped surfaces 32 and 33 at their outer ends. The conduits are locked in the coupling by indentations or dimples 41 and 42. The inner ends of the conduits sealingly abut the flanges 38 and 39 of the rings, which have an inner diameter substantially the same as the inner diameter of the conduits 26 and 27 providing a smooth passage for wires. Between the rings is a washer 40 which has an inner diameter also substantially the same as the inner diameter of the conduit to complete the smooth passage.

The sleeves 28 and 29 are joined by the sleeve 29 having an outwardly flared inner end, and the sleeve 28 having at its larger end an annular flange overlying the flared end of the other sleeve and in locking engagement therewith, clamping the washer 40 therebetween.

In operation, with the connector as shown in FIGURE 1, the end of a conduit 13 is forced into the connector 10 with its end 24' sealingly abutting the flange 22 of the resilient ring 21, and the ring being compressed between the outer surface of the coupling and the inner surface of the sleeve 14. The conduit is locked to the sleeve by the indentations 25, and the threaded locking ring 16 is threaded over the insert 15 to connect the conduit to the junction box 11.

Thus, it will be seen that I have provided an improved electrical conduit connector or coupling which meets the objectives and advantages above set forth. The unit is rugged in construction and is capable of providing a completely sealed connection which prevents the passage of moisture or dust.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An electrical conduit and connector therefor, said connector consisting of a tubular insert having an outwardly flared inner end, a sleeve having a smooth conically tapered inner surface on its inner end portion and a smaller cylindrical inner surface on its outer end portion and an annular flange at the terminal end of the inner end overlying said flared end and in locking engagement therewith, said outer end portion snugly receiving said conduit, a resilient ring of incompressible material within said sleeve having a tapered outer surface conforming to the inner surface of the tapered portion of the sleeve and having an inner end abutting said insert, the outer end of said ring being spaced slightly inwardly from the outer end of said tapered portion to leave an expansion space, the inner diameter of the ring fitting snugly over the outer surface of said conduit so that the ring is radially expanded and is forced slightly outwardly against the sleeve and is under slight compressive stress to expand into said expansion space, and an annular radially inwardly projecting flange of resilient material on the inner end of said ring, said flange having a radial dimension substantially equal to the wall thickness of said conduit, said conduit being inserted in said sleeve and ring and abutting said ring flange, said sleeve and conduit having interfitting inwardly indented portions whereby the conduit is locked to the outer end portion of the sleeve with the end of said conduit sealingly abutting the inwardly projecting flange of resilient material.

2. An electrical conduit and connector therefor in accordance with claim 1 in which said tubular insert is a second sleeve having a smooth conically tapered surface on its inner end portion and a smaller cylindrical inner surface on its outer end portion, a second resilient ring of incompressible material within said second sleeve having a tapered outer surface conforming to the inner surface of the tapered portion of said second sleeve, the outer end of said second ring being spaced slightly inwardly from the outer end of said last mentioned tapered portion to leave an expansion space, the inner diameter of said second ring fitting snugly over the outer surface of a second conduit so that said second ring is radially expanded and is forced slightly outwardly against said second sleeve and is under slight compressive stress to expand into the last mentioned expansion space, an annular radially inwardly projecting flange of resilient material on the inner end of said second ring, said last mentioned flange having a radial dimension substantially equal to the wall thickness of said second conduit, a flat washer between said sleeves held by said overlying flange and positioned between and abutting the inwardly extending flanges of said rings, said second conduit being inserted in said second sleeve and ring and sealingly abutting said second ring flange, said second sleeve and conduit having interfitting inwardly indented portions whereby the second conduit is locked to the outer end portion of the second sleeve.

References Cited by the Examiner

UNITED STATES PATENTS

| | | | |
|---|---|---|---|
| 2,270,926 | 1/1942 | Briegel | 285—382.2 |
| 2,463,407 | 3/1949 | Melton | 285—161 |
| 2,786,697 | 3/1957 | Rescheneder | 285—113 |
| 2,837,353 | 6/1958 | Ashbrook | 285—371 |
| 2,848,256 | 8/1958 | Tyler | 285—317 |
| 3,084,960 | 4/1963 | Lipka | 285—161 |
| 3,150,886 | 9/1964 | Briegel | 285—161 |

CARL W. TOMLIN, *Primary Examiner.*

S. R. MILLER, *Assistant Examiner.*